(12) United States Patent
Kientz

(10) Patent No.: US 7,933,553 B2
(45) Date of Patent: Apr. 26, 2011

(54) TUNEABLE RADIO-FREQUENCY IDENTIFICATION TAG READER AND METHOD OF READING SUCH A TAG

(75) Inventor: Steven M. Kientz, Westminster, CO (US)

(73) Assignee: Oracle America, Inc., Redwood City, CA (US)

(*) Notice: Subject to any disclaimer, the term of this patent is extended or adjusted under 35 U.S.C. 154(b) by 722 days.

(21) Appl. No.: 11/951,421

(22) Filed: Dec. 6, 2007

(65) Prior Publication Data
US 2009/0146809 A1    Jun. 11, 2009

(51) Int. Cl.
*H04B 5/00*    (2006.01)
(52) U.S. Cl. ........ 455/41.1; 455/77; 455/87; 455/150.1; 455/120; 340/572.1
(58) Field of Classification Search ................. 455/41.1, 455/77, 87, 150.1, 120, 125, 173.1, 182.3, 455/192.2, 67.11, 67.14, 115.1, 226.1; 340/572.1, 340/539.11; 235/375
See application file for complete search history.

(56) References Cited

U.S. PATENT DOCUMENTS

| | | | |
|---|---|---|---|
| 7,057,512 B2 * | 6/2006 | Stilp | 340/572.1 |
| 7,132,946 B2 * | 11/2006 | Waldner et al. | 340/572.1 |
| 7,139,141 B1 | 11/2006 | Cates et al. | |
| 7,206,156 B2 | 4/2007 | Ballard | |
| 7,227,468 B1 * | 6/2007 | Florio | 340/572.1 |
| 7,227,721 B1 * | 6/2007 | Kientz et al. | 360/132 |
| 7,304,577 B2 * | 12/2007 | Waldner et al. | 340/572.1 |
| 7,592,961 B2 * | 9/2009 | Thober et al. | 343/745 |
| 7,750,792 B2 * | 7/2010 | Smith et al. | 340/10.4 |
| 2007/0008641 A1 * | 1/2007 | Tada et al. | 360/69 |
| 2007/0091006 A1 * | 4/2007 | Thober et al. | 343/745 |
| 2008/0088417 A1 * | 4/2008 | Smith et al. | 340/10.41 |
| 2008/0180248 A1 * | 7/2008 | Lian et al. | 340/572.1 |
| 2008/0252459 A1 * | 10/2008 | Butler et al. | 340/572.1 |
| 2009/0259678 A1 * | 10/2009 | Valencia | 707/102 |
| 2010/0134257 A1 * | 6/2010 | Puleston et al. | 340/10.4 |

* cited by examiner

*Primary Examiner* — Minh D Dao
(74) *Attorney, Agent, or Firm* — Brooks Kushman P.C.

(57) ABSTRACT

A radio-frequency identification (RFID) system is provided that includes an RFID reader that is provided with a capacitor apparatus or circuit that may be used to tune the transmitter to a different frequency to improve communication with an RFID tag. The frequency may be changed by the capacitor circuit automatically providing a different capacitance output to the RFID reader. A tape drive reader and magnetic tape cartridge may be provided in combination with such an RFID system. A method is disclosed for reading a data packet stored on an RFID tag by a reader that can be adjusted by changing the capacitance provided to the RFID reader.

15 Claims, 2 Drawing Sheets

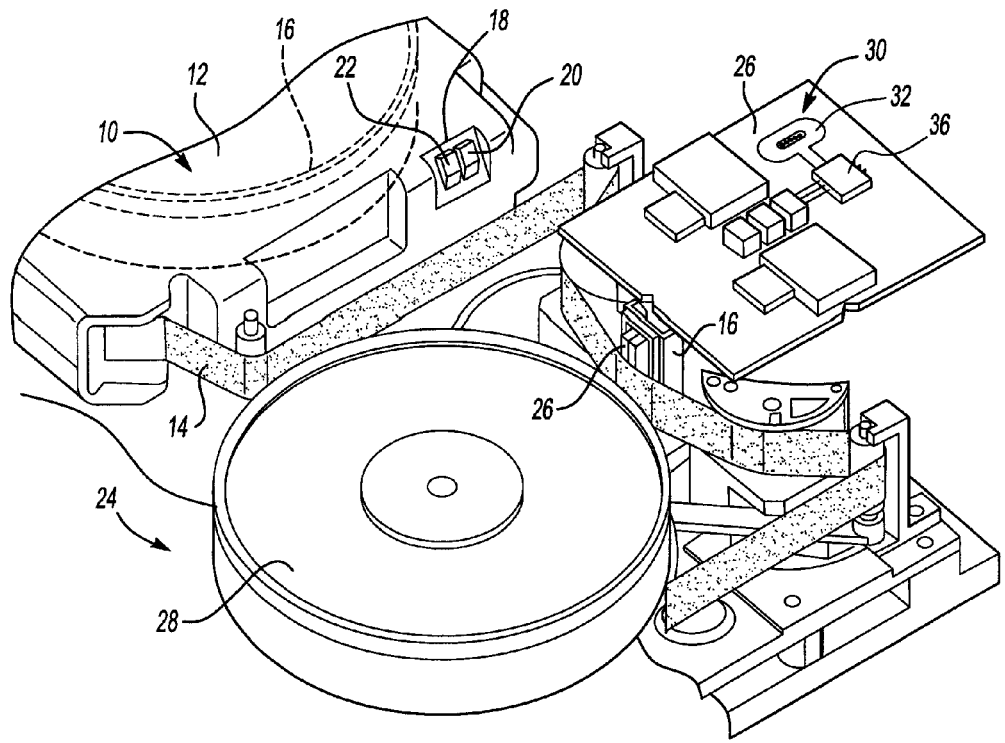
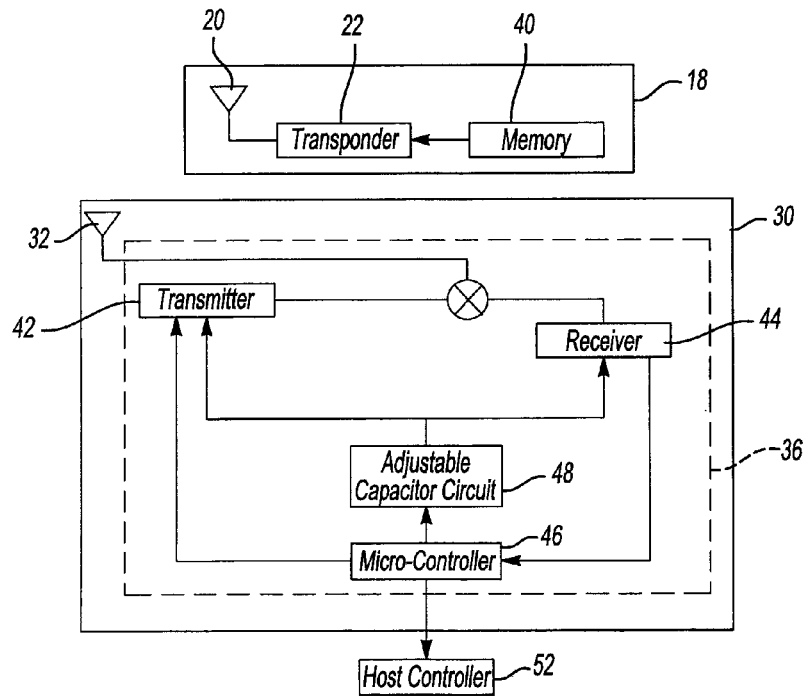

TUNEABLE RADIO-FREQUENCY IDENTIFICATION TAG READER AND METHOD OF READING SUCH A TAG

BACKGROUND OF THE INVENTION

1. Field of the Invention

The present invention relates to radio-frequency identification (RFID) tag readers and a method of storing and remotely retrieving data from RFID tags or transponders.

2. Background Art

RFID tags or transponders are used to identify objects using radio waves. Generally, RFID tags contain an integrated circuit for storing and processing information, modulating and demodulating a radio-frequency signal and an antenna for receiving and transmitting the signal. One type of RFID tag is a passive RFID tag that has no internal power supply. The incoming radio-frequency signal from a reader provides power for the RFID tag to power-up and transmit a responsive signal. On the other hand, active RFID tags have their own power source that is used to power the integrated circuits of the active RFID tag to broadcast a signal to a reader.

RFID readers include a transmitter and receiver that are tuned to communicate with an RFID tag. RFID readers emit a signal that is received by the antenna of the RFID tag. The RFID tag responds to the signal from the RFID reader with a signal that includes a transmitted data packet. The transmitted data packet is decoded by the RFID reader and provided to a controller associated with the RFID reader.

RFID tags are sensitive to environmental factors that can alter the RF magnetic field. The proximity of an RFID tag to a metal object can distort the RF magnetic field making it difficult to establish communication between an RFID reader and an RFID tag. Even if an RFID tag is manufactured to communicate on a predetermined frequency, environmental interference may effectively change the radio-frequency signal. Load modulation is set on RFID readers by setting a manually tuneable capacitor generally between 40-100 pf. With current production RFID readers, once the load modulation is set in an RFID reader, it is not changed. The preset RFID reader may not work with all RFID tags due to changes in the RF magnetic field caused, in particular, in hostile environments or areas having metal objects that may cause interference. In addition, the resonant frequency of a group of RFID tags may vary from one to another rendering some RFID tags readable and others unreadable. The greater the difference between the frequency of the RFID tag and that of the RFID reader, the lower will be the strength and amount of modulation of the RFID tag output signal.

One application for RFID tags and RFID readers that has been developed is in the area of data storage. One example of such an RFID reader is provided on the T10000 tape drive manufactured by Sun Microsystems, Inc. that has a variable manual set capacitor manufactured by Panansonic. Data storage tape cartridges may be provided with an RFID tag that is placed in proximity to an RFID reader that forms part of a data storage tape drive. Data storage tape drives may have metallic components that can interfere with transmission and reception of the radio-frequency signals sent between the RFID tag and RFID reader. The RFID reader in a data storage tape drive is set during manufacture of the tape drive system to a selected frequency. When a data storage tape is placed in the drive, the reader of the data storage tape drive attempts to establish communication with the RFID tag. If the data signal is not received from the RFID tag, the RFID reader of the data storage tape drive may reject the tape cartridge. If a tape cartridge is rejected, replacement of the RFID tag or preparation of a substitute cartridge may be required.

These and other problems are addressed by Applicant's invention as summarized below.

SUMMARY OF THE INVENTION

According to one aspect of the present invention, a variable capacitor, or switched capacitor, may be provided in the reader/decoder circuitry of the RFID reader. The variable capacitor, or switched capacitor, may permit the RFID reader to be tuned for a wide range of RFID tags instead of being set for a specific operation point frequency. The programmable capacitor, or switched capacitor, could be used to select from a plurality of capacitances until successful communication with the RFID tag is achieved by the RFID reader.

According to another aspect of the invention, the need to manually tune the RFID reader during manufacture can be eliminated. The method of the present invention can be used to provide a self-tuning RFID reader.

According to another aspect of the invention, a manually set capacitor in an RFID reader can be replaced with a programmable variable capacitor that may be provided in a single chip. Alternatively, a digital switch and several surface mount capacitors could provide a RFID reader with a range of capacitance that would be a less complicated solution than a programmable variable capacitor integrated circuit.

According to another aspect of the present invention, a radio-frequency identification system is provided that includes an RFID tag and an RFID reader. The RFID tag includes an antenna, a transponder and a memory device. The RFID reader includes a decoder circuit that includes a transmitter circuit, a receiver circuit and a controller. The transmitter circuit and receiver circuit are tuned to one of a plurality of frequencies by a capacitor apparatus that can be adjusted to change capacitance of the capacitor apparatus to tune the transmitter and receiver to a second frequency. The controller may evaluate data received from the decoder circuit to determine whether useful data is received by the controller. The controller may then accept the data, or if the data received by the controller is unacceptable, the controller may switch the capacitor apparatus to a different frequency.

According to another aspect of the present invention, a combination may be provided of a tape drive reader and a magnetic tape cartridge. The tape drive reader having a tape drive and a read/write head for reading data from and writing data to a magnetic tape. The tape cartridge has a housing, at least one reel that retains the magnetic tape with the cartridge being inserted into the tape drive reader for reading and writing data to the magnetic tape. An RFID tag may be provided on the tape cartridge that has a predetermined communication frequency. A controller may be provided as part of the tape drive reader that has an RFID reader/decoder that includes a transmitter circuit and a receiver circuit that are tuned to one of a plurality of frequencies by a capacitor circuit. The RFID reader/decoder may provide data from the RFID tag to the controller which determines whether the data is useable. If the data is not useable, the controller may switch the capacitor circuit to a different frequency. The controller may also switch to additional frequencies, if needed.

According to another aspect of the present invention, a method of reading a data packet is stored on a RFID tag is provided. The method comprises placing the RFID tag within range of an RFID reader that has a decoder circuit. Transmitting an interrogation signal having one frequency to the RFID tag to induce the RFID tag to transmit a signal representative of the data in the data packet that is received by the decoder circuit. The integrity of the data packet received by the decoder circuit is tested. The frequency of the decoder circuit is changed if the integrity of the data packet is not acceptable. The data packet is sent to a controller of the RFID reader if the integrity of the data is acceptable.

According to other aspects of the invention, the method may further comprise attaching the RFID tag to a data storage tape cartridge and providing the RFID reader as part of a data storage tape reader. The frequency of the RFID reader may be changed by switching a switched capacitor that is provided with a plurality of discrete potential output capacitances. Alternatively, the step of changing the capacitance may be performed by adjusting a variable capacitor. The variable capacitor or switched capacitor may be electronically controlled.

Since any difference between the frequency of the RFID tag and that of the RFID reader will reduce the output strength and amount of modulation of the RFID tag output signal, having the capability of automatically reducing a frequency difference represents an effective and efficient improvement in the quality of an RFID operation.

These and other aspects of Applicant's invention will be better understood in view of the attached drawing and the following detailed description of the illustrated embodiment.

BRIEF DESCRIPTION OF THE DRAWINGS

FIG. 1 is a fragmentary perspective view of a tape drive and data storage tape cartridge that includes an RFID tag which is oriented to be read by a RFID reader associated with the tape drive;

FIG. 2 is a diagrammatic view of an RFID tag and RFID reader that provide data to a host controller.

DETAILED DESCRIPTION OF THE PREFERRED EMBODIMENT(S)

Figure 3:
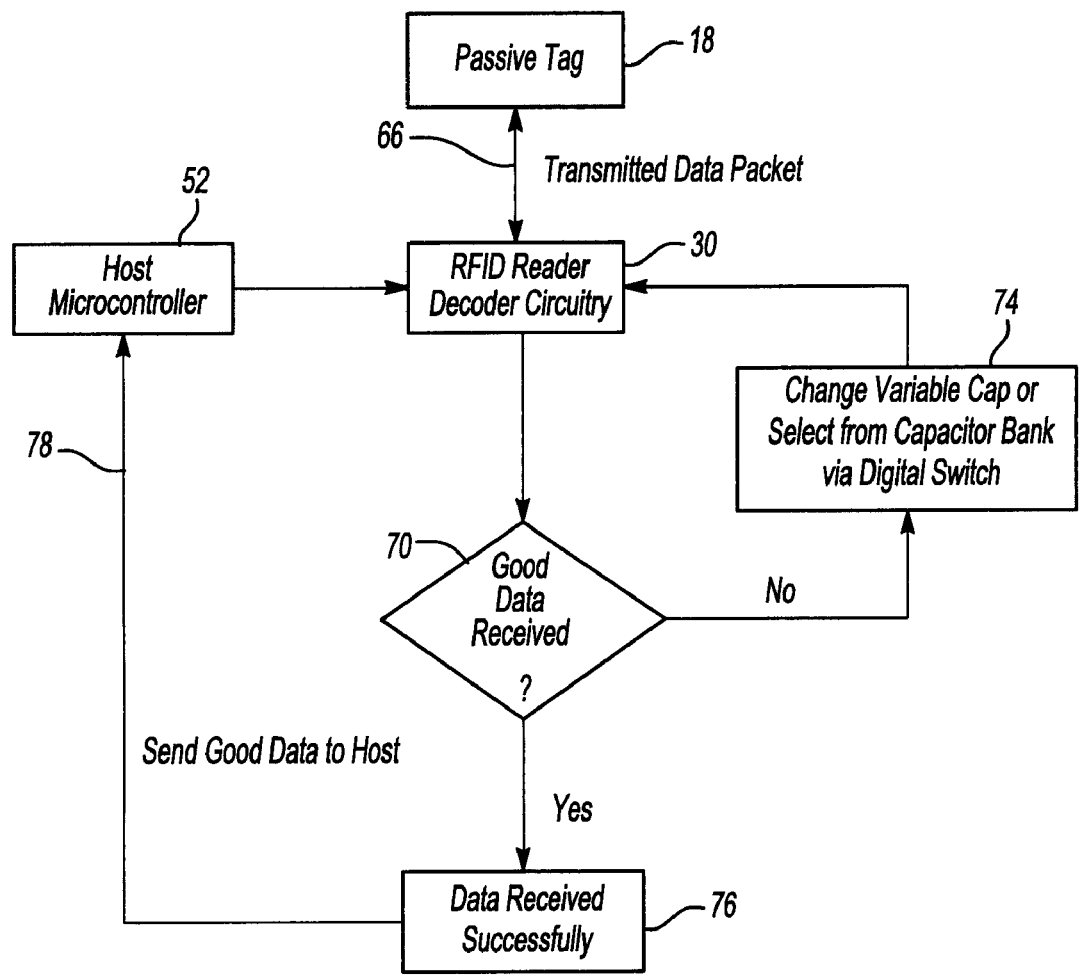
FIG. 3 is a flowchart depicting a RFID tag, a RFID reader that tests the quality of the data packet reception and can either accept the data or change a variable capacitor circuit apparatus to change the frequency of the RFID reader/decoder circuit.

Referring to FIG. 1, a data storage tape cartridge 10 is illustrated that includes a housing 12 for a magnetic tape 14 that is retained within the housing 12 on a tape reel 16. An RFID tag 18 is attached to the housing 12. The RFID tag includes an antenna 20 and a transponder 22. The function of the transponder 22 will be described more specifically with reference to FIG. 2 below.

A tape drive 24 receives the data storage tape cartridge 10 and includes a read/write head 26 that reads the magnetic tape 14 as it is fed from the tape reel 16 and the housing 12 to the tape reel 28 of the tape drive 24. An RFID reader 30 is included as part of the tape drive 24. The RFID reader 30 includes an antenna 32 and a decoder chip 36. The structure and function of the RFID reader 30 will be described more specifically with reference to FIG. 2 below.

Referring to FIG. 2, the RFID tag 18 is shown to include an antenna 20 that is used by the transponder 22 to communicate with the RFID reader 30. The transponder receives a data packet that is stored in the memory 40. The transponder 22 and memory 40 may be combined or separate circuit elements that are provided on the RFID tag 18.

The RFID reader 30 initially transmits a signal to the antenna 20 of the RFID tag. In the case of a passive RFID tag, the energy from the signal transmitted from the antenna 32 energizes the RFID tag 18. In response, the RFID tag 18 transmits the data packet stored in the memory 40 by means of the transponder 22 which returns a radio signal through the antenna 20 to the antenna 32 of the RFID reader 30. The return signal is provided to the decoder chip 36 of the RFID reader 30. The decoder chip 36 includes a transmitter 42 and a receiver 44. The transmitter 42 and receiver 44 may be separate circuit elements or may be combined. If combined, the combined transmitter receiver may be referred to as a transceiver and is fully equivalent to the separate circuit elements. The initial signal sent to the RFID tag is sent by the transmitter 42 through the antenna 32 of the RFID reader 30 as previously described. The return signal is received by the antenna 32 and sent to the receiver 44.

The receiver 44 transmits the data packet to a microcontroller 46 of the decoder chip 36. The controller 46 checks the integrity of the data packet to determine if a complete data packet has been received. If the data packet is incomplete or corrupted, the controller actuates an adjustable capacitor circuit 48. The adjustable capacitor circuit 48 may be a switched bank of capacitors or may alternatively be a variable capacitor. In either embodiment, a new capacitance value changes the frequency of the transmitter and receiver and restarts the identification process as described above. It is expected that in most instances the microcontroller 46 will recognize and accept the data packet received from the receiver 44 and provide the data packet to the host controller 52 of the tape drive.

Referring to FIG. 3, a passive RFID tag 18 is shown in close proximity to an RFID reader 30 that is provided with decoder circuitry for decoding a transmitted data packet 66 indicated by the arrow extending between the RFID passive tag 18 and the RFID reader 30. The RFID reader/decoder circuitry 30 provides data received from the passive tag 18 to an evaluation or test circuit 70 that determines if acceptable data is received. If acceptable data is not received by the RFID reader 30, the frequency of the RFID reader may be changed at 74 by changing the capacitance provided to the reader/decoder circuit 30. The decoder circuitry may receive a changed capacitance value from a variable capacitor. Alternatively, a digital switch may select a different capacitance value from one of a bank of capacitors.

As previously stated, since any difference between the frequency of the RFID tag and that of the RFID reader will reduce the output strength and amount of modulation of the RFID tag output signal, having the capability of automatically reducing a frequency difference represents an effective and efficient improvement in the quality of an RFID operation.

The RFID reader/decoder 30 may include a transmitter 42 and a receiver 44, as illustrated in FIG. 2, or may be provided in the form of a transceiver. The term transmitter circuit and receiver circuit may be used to include either alternative.

The variable capacitor or switched capacitor provides adjustable capacitance at 74 that may be changed electronically. The adjustable capacitor may be used to set the resonant frequency of the RFID reader.

A switched capacitor may be provided by a circuit that permits different capacitors to be switched on and off to provide different levels of capacitance. The capacitors of the switched capacitor may be surface-mount capacitors that are connected to a switch that is electronically controlled to select from different capacitors in sequence until the RFID reader is properly tuned and receives acceptable data from the RFID tag 18.

When acceptable data is received at 70, the system confirms that the data was received successfully at 76. When data is successfully received, the acceptable data is sent, as indicated on line 78, to the host microcontroller at 52.

The method of reading a data packet stored on an RFID tag 18 may be initiated by placing the RFID tag 18 within range of an RFID reader 30 that has a decoder circuit 74. An interrogation signal having a first frequency is transmitted to the RFID tag 18 to induce the RFID tag 18 to transmit to the RFID reader 30 a data signal representative of the data in the data packet 66. The integrity of the data 66 received by the decoder circuit 30 is tested at 70 and the frequency of the interrogation signal sent by the transmitter 42 and the frequency of the signal that may be received by the receiver 44 may be automatically changed if the integrity of the data 66 is not acceptable or if the initial transmission from the transmitter 42 of the reader 30 is ineffective. A failure to establish communication is equivalent to transmission of unacceptable data. The data 66 is sent by the controller 46 of the RFID reader 30 to the host controller 52 if the integrity of the data is acceptable.

The method may further comprise attaching the RFID tag 18 to a data storage tape cartridge 10 and providing the RFID reader 30 as part of a data storage tape drive 24.

The step of changing the frequency may be performed by switching a switched capacitor that is provided with a plurality of discrete potential output capacitances. Alternatively, the step of changing the frequency may be performed by adjusting a variable capacitor. The switched capacitor or variable capacitor may be electronically controlled.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A radio frequency identification (RFID) system comprising:
    an RFID tag that includes a first antenna for receiving and transmitting radio frequency signals, a memory device for storing data, and a transponder connected to the memory device and to the first antenna for transmitting a data signal representative of the stored data, wherein the RFID tag is attached to a data storage cartridge;
    an RFID reader is spaced apart from the RFID tag and is part of a data storage tape reader, the RFID reader includes a second antenna for transmitting and receiving radio frequency signals, a decoder circuit that includes a transmitter circuit for transmitting an interrogation signal to the transponder, and a receiver circuit for receiving the data signal sent by the transponder in response to the RFID tag having received the interrogation signal, the RFID reader also includes a capacitor apparatus that can be adjusted to tune the transmitter and receiver to one of a plurality of frequencies, the RFID reader further includes a controller for directing the transmitter circuit to transmit the interrogation signal and for evaluating the data signal received by the receiver circuit to determine whether or not the data is acceptable, the controller accepts the data if acceptable and directs the capacitor apparatus to change the frequency of the transmitter circuit and receiver circuit to another one of the plurality of frequencies if the data is not acceptable.

2. The RFID system of claim 1 wherein the capacitor apparatus may provide a plurality of capacitance values from which a discrete capacitance value can be selected to tune the transmitter and receiver to one of the plurality of different frequencies.

3. The RFID system of claim 1 wherein the capacitor apparatus is a switched capacitor.

4. The RFID system of claim 1 wherein the capacitor apparatus is a variable capacitor.

5. A tape drive reader and magnetic tape cartridge, in combination, comprising:
    a tape cartridge including a housing, at least one reel rotatably supported by the housing, and magnetic tape disposed on the reel for storing data;
    an RFID tag disposed on the tape cartridge and including a transponder for transmitting a data signal representative of data stored on the tape;
    a tape drive reader including a tape drive and a read-write head for reading data from and writing data to the magnetic tape, the tape cartridge being inserted into the tape drive reader to feed the tape across the read-write head, the tape drive reader additionally including a reader/decoder circuit, a transmitter circuit for transmitting an interrogation signal to the transponder, a receiver circuit for receiving a data signal sent by the transponder in response to the RFID tag having received the interrogation signal, a capacitor apparatus that can be adjusted to tune the transmitter circuit and receiver circuit to one of a plurality of frequencies, and a controller for directing the transmitter circuit to transmit the interrogation signal and for evaluating the data signal received by the receiver circuit to determine whether or not the data is acceptable, the controller accepting the data if acceptable and directing the capacitor apparatus to change the frequency of the transmitter circuit and receiver circuit to another one of the plurality of frequencies if the data is not acceptable.

6. The combination of claim 5 wherein the RFID tag is a passive tag.

7. The combination of claim 5 wherein the capacitor circuit may provide a plurality of capacitance values from which one capacitance value can be selected to tune the transmitter circuit and receiver circuit to one of the plurality of frequencies.

8. The combination of claim 5 wherein the capacitor circuit is a switched capacitor.

9. The combination of claim 5 wherein the capacitor circuit is a variable capacitor.

10. The combination of claim 9 wherein the variable capacitor is electronically controlled.

11. A method of reading a data packet stored on an RFID tag comprising:
    attaching the RFID tag to a data storage tape cartridge;
    providing a RFID reader as part of a data storage tape reader;
    placing the RFID tag within range of the RFID reader that has a decoder circuit;
    transmitting an interrogation signal having a first frequency to the RFID tag to induce the RFID tag to transmit a data signal to the RFID reader that is representative of the data in the data packet;
    testing the integrity of the data received by the decoder circuit;
    changing the frequency of the interrogation signal in the RFID reader if the integrity of the data is not acceptable; and
    sending the data to a controller of the RFID reader if the integrity of the data is acceptable.

12. The method of claim 11 wherein the step of changing the frequency is performed by switching a switched capacitor that is provided with a plurality of discrete potential output capacitances.

13. The method of claim 12 wherein the switched capacitor is electronically controlled.

14. The method of claim 11 wherein the step of changing the frequency is performed by adjusting a variable capacitor.

15. The method of claim 14 wherein the variable capacitor is electronically controlled.

* * * * *